(12) United States Patent
Gimkiewicz

(10) Patent No.: US 12,306,590 B2
(45) Date of Patent: May 20, 2025

(54) TEMPERATURE CONTROL FOR A TIMEPIECE

(71) Applicant: Omega SA, Biel/Bienne (CH)

(72) Inventor: Christiane Gimkiewicz, Ismaning (DE)

(73) Assignee: Omega SA, Biel/Bienne (CH)

( * ) Notice: Subject to any disclaimer, the term of this patent is extended or adjusted under 35 U.S.C. 154(b) by 439 days.

(21) Appl. No.: 17/962,866

(22) Filed: Oct. 10, 2022

(65) Prior Publication Data

US 2023/0195042 A1 Jun. 22, 2023

(30) Foreign Application Priority Data

Dec. 22, 2021 (EP) .................... 21217076

(51) Int. Cl.
*G04B 43/00* (2006.01)
*G05D 23/19* (2006.01)

(52) U.S. Cl.
CPC ........... *G04B 43/005* (2013.01); *G05D 23/19* (2013.01)

(58) Field of Classification Search
CPC .............................. G04B 43/005; G05D 23/19
See application file for complete search history.

(56) References Cited

U.S. PATENT DOCUMENTS

| 4,260,225 A | 4/1981 | Walles | |
| 5,085,507 A * | 2/1992 | Williams | G01S 5/163 |
| | | | 250/227.31 |
| 11,475,172 B2 * | 10/2022 | Adachi | G06F 1/1609 |
| 2002/0056790 A1 * | 5/2002 | Trimmer | B64G 1/50 |
| | | | 244/171.7 |
| 2013/0088469 A1 | 4/2013 | Yee | |
| 2014/0184621 A1 | 7/2014 | Brosnihan et al. | |
| 2020/0293085 A1 * | 9/2020 | Adachi | G02F 1/133524 |

FOREIGN PATENT DOCUMENTS

| EP | 2 736 046 A2 | 5/2014 |
| EP | 2 736 046 A3 | 5/2014 |
| EP | 3 835 891 A1 | 6/2021 |
| WO | WO 2012/165721 A1 | 12/2012 |
| WO | WO 2014/105718 A1 | 7/2014 |

OTHER PUBLICATIONS

European Search Report Issued Jun. 2, 2022 in European Application 21217076.5 Filed on Dec. 22, 2021 (with English Translation of Categories of Cited Documents), 3 pages.

* cited by examiner

Primary Examiner — Edwin A. Leon
Assistant Examiner — Sean R Brannon
(74) Attorney, Agent, or Firm — Oblon, McClelland, Maier & Neustadt, L.L.P.

(57) ABSTRACT

A temperature control device for a timepiece, includes a first light-transmitting portion, defining with a second adjacent portion an intermediate chamber of variable dimensions according to the temperature of the first portion, the first portion includes first microlouvers according to a first spatial distribution, the second portion includes second microlouvers according to a second spatial distribution and substantially facing the first microlouvers, to superimpose partially or totally in certain relative positions between the first portion and the second portion, in order to vary the transmission and/or the reflection of the incident light on the first portion between a maximum and a minimum.

16 Claims, 1 Drawing Sheet

TEMPERATURE CONTROL FOR A TIMEPIECE

CROSS-REFERENCE TO RELATED APPLICATION

This application claims priority to European Patent Application No. 21217076.5, filed on Dec. 22, 2021, the entire disclosure of which is hereby incorporated herein by reference.

TECHNICAL FIELD OF THE INVENTION

The invention relates to a temperature control device for timepiece, including a first light-transmitting portion, and a second adjacent to said first portion but remote from said first portion and defining with it an intermediate chamber of variable dimensions in an axial direction and/or a radial direction depending on the temperature of said first portion.

The invention also relates to a timepiece, particularly a watch, including at least one such temperature control device.

The invention relates to the field of temperature control in a timepiece, particularly a watch, to make its operation possible, without noteworthy alteration of the rate, in an environment subjected to significant temperature amplitudes, or also to very high or very low temperatures, such as can be encountered particularly in scientific, aeronautical or astronautical applications.

TECHNOLOGICAL BACKGROUND

The temperature within a timepiece, particularly a watch, has a direct influence on its operation. The operating clearances must remain compatible with the expansion phenomena within the thermal range of use. The rate of the oscillator, in particular when it concerns a mechanical oscillator, is particularly affected by significant temperature differences, which is not conducive to applications or experiments that depend on a correct and stable estimation of the time.

External insulation devices are voluminous, and may be uncomfortable for users.

Devices integrated into a watch, such as reflective crystals, may make its display difficult, or even impossible, to read.

SUMMARY OF THE INVENTION

The invention proposes to integrate into a timepiece, and in particular into the reduced volume constituted by a watch case, a device making it possible to better regulate the temperate within this timepiece.

To this end, the invention relates to a temperature control device for timepiece, including a first light-transmitting portion, and a second portion defining with said first portion an intermediate chamber of variable dimensions in an axial direction and/or a radial direction depending on the temperature of said first portion, said first portion includes a plurality of first microlouvers according to a first spatial distribution, in that said second portion includes a plurality of second microlouvers according to a second spatial distribution, said first and second portions provided with these first and second microlouvers being configured to move in relation to one another, thus varying the transmission and/or the reflection of said light on said first portion between a maximum and a minimum.

In other words the temperature control device for timepiece, includes a first light-transmitting portion, defining with a second adjacent portion an intermediate chamber (9) of variable dimensions according to the temperature of the first portion, the first portion includes first microlouvers according to a first spatial distribution, the second portion includes second microlouvers according to a second spatial distribution and substantially facing the first microlouvers, to superimpose partially or totally in certain relative positions between the first portion and the second portion, in order to vary the transmission and/or the reflection of the incident light on the first portion between a maximum and a minimum.

In other embodiments:
the first microlouvers and the second microlouvers are arranged to superimpose partially or totally in certain relative positions of said first portion in relation to said second portion, in order to vary the transmission and/or the reflection of the incident light on said first portion between a maximum and a minimum;
said first portion is capable of moving in an axial direction and/or a radial direction relative to said second portion depending on the temperature of this first portion;
said first portion has a first thermal expansion coefficient, which is different from a second thermal expansion coefficient of said second portion;
said first portion or said second portion is mounted on a third portion, which has a third thermal expansion coefficient that is different from a first thermal expansion coefficient of said first portion and/or from a second thermal expansion coefficient of said second portion;
said first spatial distribution and said second spatial distribution are homothetic or identical;
said first microlouvers are located on a lower surface of said first portion, at said intermediate chamber;
said second microlouvers are located on an upper surface of said second portion, at said intermediate chamber;
said first microlouvers and/or said second microlouvers include a reflective coating;
said first spatial distribution and second spatial distribution, and the dimensions of said first portion and of said second portion are adjusted for a maximum reflection at the highest temperatures, and for a maximum transmission at the lowest temperatures;
said first portion includes at least one first coated and/or structured reflective portion, arranged to send back the oblique light rays in relation to an axial direction of said timepiece and to allow light rays to pass through in this axial direction;
at least one said first reflective portion includes prismatic structures protruding on said first portion, disposed according to said first spatial distribution, and each including a reflective coating;
at least one said first reflective portion includes reflective structures embedded in the thickness of said first portion for a better abrasion resistance, disposed according to said first spatial distribution, and each including a reflective coating;
said first portion is a protective cover and in that said second portion is a watch crystal.

The invention also relates to a timepiece, particularly a watch, including at least one such temperature control device.

BRIEF DESCRIPTION OF THE FIGURES

The aims, advantages and features of the invention will become more apparent upon reading the following detailed description, with reference to the appended drawings, wherein:

FIGS. 2 and 4 correspond to a temperature below the optimum temperature;

and FIGS. 3 and 5 correspond to a temperature below the optimum temperature;

Figure 1:
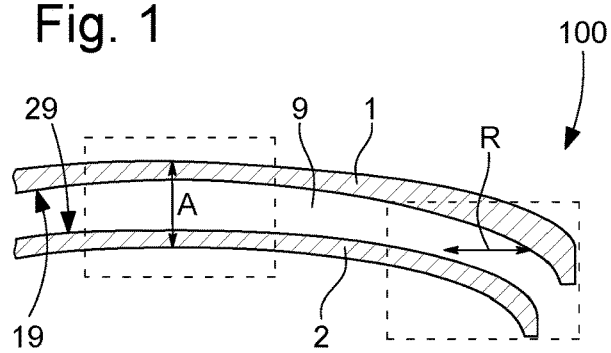
FIG. 1 shows, schematically and in cross-section of a timepiece consisting of a watch, a first portion that is a protective cover, above a second portion that is a watch crystal; an arrow A indicates the activation by axial expansion, whereas an arrow R corresponds to the activation by radial expansion; the operational portions of the watch, not shown, are below the second portion, that is to say on the side opposite the first portion.
Figure 9:
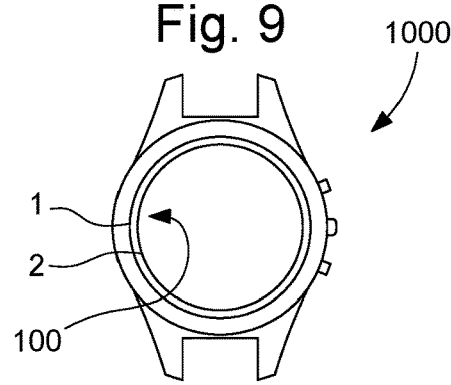
Figure 2:
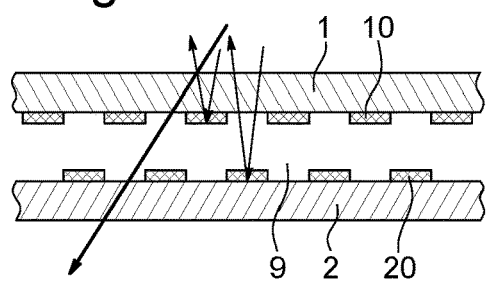
FIGS. 2 to 5 show, in a similar manner to FIG. 1, the local detail of the relative positioning of microlouvers that include respectively the first portion and the second portion, respectively first microlouvers according to a first spatial distribution, and second microlouvers according to a second spatial distribution, which constitute the temperature control device according to the invention, and which are arranged to superimpose partially or totally in certain relative positions of the first portion in relation to the second portion, in order to vary the transmission and/or the reflection of the incident light on the first portion between a maximum and a minimum, and thus vary the temperature, or stabilise it, within the timepiece.
Figure 4:
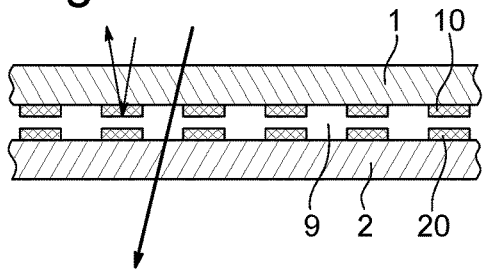
Figure 3:
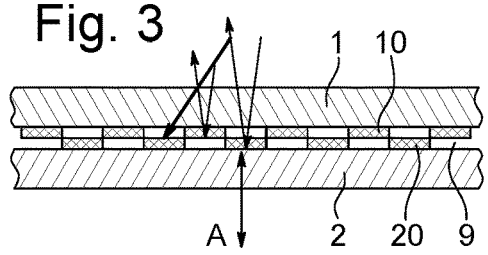
Figure 5:
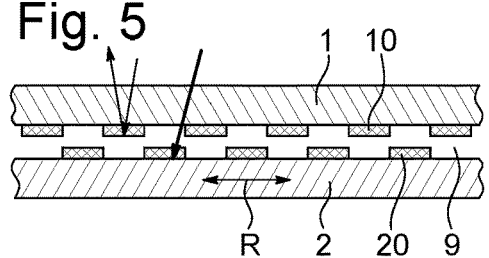
Figure 6:
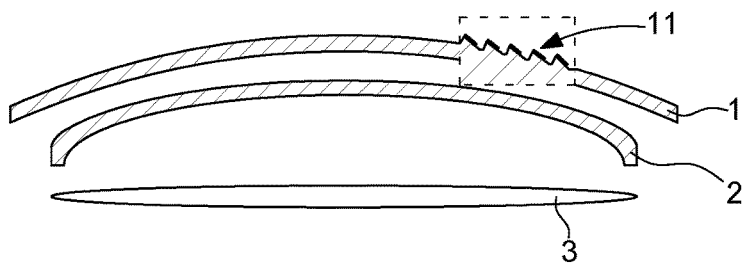
Figure 7:
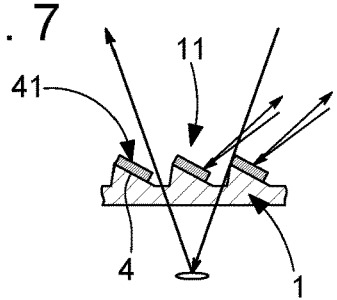
Figure 8:
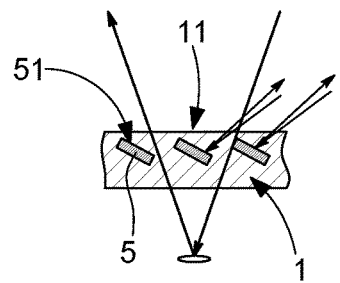

the passage of the position from FIG. 2 to that of FIG. 3 corresponds to a relative axial movement in the axial direction (moved away from FIG. 3 towards FIG. 2, brought closer in the opposite case);

whereas the passage of the position from FIG. 4 towards that of FIG. 5 corresponds to a relative radial movement in the direction R;

FIG. 6 shows, in a similar manner to FIG. 1, a variant wherein the first portion includes at least one first coated and/or structured reflective portion, which is arranged to send back the oblique light rays in relation to an axial direction of the timepiece, and to allow light rays to pass through in this axial direction;

FIG. 7 shows, in a similar manner to FIG. 6, a variant wherein such a first reflective portion includes prismatic structures protruding on the first portion, disposed according to the first spatial distribution, and each including a reflective coating; the most inclined rays, that can be seen on the right-hand portion of the figure, are reflected outside of the field of vision of the user, whereas those located within their field of vision are transmitted towards the display of the watch, which makes it possible for the user to read the time or other indications displayed by the watch;

FIG. 8 shows, in a similar manner to FIG. 6, a variant wherein such a first reflective portion includes reflective structures embedded in the thickness of the first portion for a better abrasion resistance, disposed according to the first spatial distribution, and each including a reflective coating;

FIG. 9 shows, schematically, a timepiece, here a watch, including such a temperature control device.

DETAILED DESCRIPTION OF THE INVENTION

The invention relates to a temperature control device 100 for timepiece 1000, including a first light-transmitting portion 1, and a second portion 2 adjacent to the first portion 1 but remote from the first portion 1 and defining with it an intermediate chamber 9. This intermediate chamber 9 is of variable dimensions in an axial direction A and/or a radial direction R depending on the temperature of the first portion 1.

The invention implements microlouvers to ensure the temperature control in the watch, to ensure the regularity of the rate when it concerns a mechanical or electromechanical watch. Each microlouver, otherwise called "microlouver structure" or also "microlouver structured element", is formed in the first or the second portion. This microlouver may modify the angle of incidence, the angle of reflection and/or the angle of refraction of the incident light on said first portion. The microlouver may have refractory features or features that modify the direction of the light passing through or reflecting on this microlouver.

According to the invention, the first portion 1 includes a plurality of first microlouvers 10 according to a first spatial distribution, and the second portion 2 includes a plurality of second microlouvers 20 according to a second spatial distribution and substantially facing first microlouvers 10. The first microlouvers 10 and the second microlouvers 20 are arranged to superimpose partially or totally in certain relative positions of the first portion 1 in relation to the second portion 2, in order to vary the transmission and/or the reflection of the incident light on the first portion 1 between a maximum and a minimum. Each portion thus carries a specific spatial distribution of microlouvers, which thus superimpose for a minimum and a maximum of transmission/reflection according to the position of the first portion 1 in relation to the second portion 2. Thus, this device makes it possible to vary the temperature, or stabilise it, within the timepiece according to the relative position of the microlouvers.

A movement under the action of the temperature is possible, if, either a portion has a thermal expansion coefficient different than that of the other portion, or if one of the portions is mounted on a third portion with a different thermal expansion coefficient.

More particularly, the first portion 1 has a first thermal expansion coefficient, which is different from a second thermal expansion coefficient of the second portion 2.

More particularly, the first portion 1 or the second portion 2 is mounted on a third portion, which has a third thermal expansion coefficient that is different from a first thermal expansion coefficient of the first portion 1 and/or from a second thermal expansion coefficient of the second portion 2. Even more particularly, the third thermal expansion coefficient is different both from the first thermal expansion coefficient and from the second thermal expansion coefficient.

More particularly, the first spatial distribution and the second spatial distribution are homothetic or identical.

More particularly, the first microlouvers 10 are located on a lower surface 19 of the first portion 1, at the intermediate chamber 9.

More particularly, the second microlouvers 20 are located on an upper surface 29 of the second portion 2, at the intermediate chamber 9.

More particularly, the first microlouvers 10 and/or the second microlouvers 20 include a reflective coating More particularly, for a good control of the heat, the first spatial distribution and second spatial distribution, and the dimensions of the first portion 1 and of the second portion 2 are adjusted for a maximum reflection at the highest temperatures, and for a maximum transmission at the lowest temperatures.

FIG. 1 shows, schematically and sectionally, a first portion 1 that is a protective cover, above a second portion 2 that is a watch crystal; the arrow A indicates the activation by axial expansion, whereas the arrow R corresponds to the activation by radial expansion.

FIGS. 2 to 5 show the local detail of the relative positioning of the microlouvers 10 and 20 that include respectively the first portion 1 and the second portion 2. FIGS. 2 and 4 correspond to a temperature below the optimum temperature, and FIGS. 3 and 5 correspond to a temperature below the optimum temperature. The passage of the position of FIG. 2 to that of FIG. 3 corresponds to a relative axial movement in the axial direction A (moved away from FIG. 3 towards FIG. 2, closer together in the opposite case), whereas the passage from the position of FIG. 4 to that of FIG. 5 corresponds to a relative radial movement in the direction R. For example the first microlouvers 10 forming the reflective layer of the first portion 1 are made of aluminium oxynitride ALON, with optical transparency greater than 85%, in the range of wavelengths from 250 to 4000 nanometres (from the near ultraviolet spectrum to the infrared band), whereas the second microlouvers 20, which have a higher thermal expansion coefficient, are made of "Hexalite" or similar.

It is, thus, advantageous to play on the thermal expansion coefficients of the various components, here glass, to align the spatial distributions of the microlouvers, to regulate the flow of radiation reaching the surface of the watch, and to therefore regulate the thermal load of the watch.

More particularly, as can be seen in FIG. 6, the first portion 1 includes at least one first coated and/or structured reflective portion 11, which is arranged to send back the oblique light rays in relation to an axial direction of the timepiece 1000 and to allow light rays to pass through in this axial direction.

The spatial distributions may include a relief to take advantage of a certain behaviour depending on the incidence such as the watch in FIG. 7, where at least one such first reflective portion 11 includes prismatic structures 4 protruding on the first portion 1, disposed according to the first spatial distribution, and each including a reflective coating 41. The most inclined rays, that can be seen on the right-hand side of the figure, are reflected outside of the field of vision of the user, whereas those located within their field of vision are transmitted towards the display of the watch, which makes it possible for the user to read the time or other indications displayed by the watch.

More particularly, as can be seen in FIG. 8 and according to the same principle as FIG. 7, at least one such first reflective portion 11 includes reflective structures 5 embedded in the thickness of the first portion 1 for a better abrasion resistance, disposed according to the first spatial distribution, and each including a reflective coating 51.

In a variant not illustrated, the timepiece 1000 includes at least one internal temperature sensor, and an internal control means for comparing the measured temperature with a setpoint temperature, and to control an actuator, for example piezoelectric, to move the first portion 1 and/or the second portion 2 in the axial direction A and/or the radial direction R.

More particularly, the first portion 1 is a protective cover and the second portion 2 is a watch crystal. Naturally other portions of the watch may be suitable for the installation of microlouvers on two adjacent portions of the watch, such as bezel, flange, dial, portions of the movement, or others.

It is understood that the invention makes it possible to use the capacity of the light, both to transfer the heat, particularly by reflection, and to consult the display of the watch, particularly to read the time. Until now, there was no differentiation in the spectrum. It could be considered the fact of optically closing the watch in a hot state would make it impossible to read its display. However, it is possible to implement coatings that, for example, transmit visible light, and reflect another band such as infrared. Hot mirrors particularly make it possible to transmit ultraviolet light or certain frequencies of the visible spectrum. For example, hot mirrors are known with high transmission in the 400-690 nanometre band, and high reflection in the 750-1125 nanometre band; or also transmitting 85% of visible light and reflecting near infrared light and at least 90% of infrared light; or also transmitting 80% of visible light and of ultraviolet light and reflecting 70% of infrared light.

These arrangements make it possible to make the microlouvers permeable to the visible spectrum to make it possible for the user to read the time, even in their closed state.

The invention also relates to a timepiece 1000 including at least one such temperature control device 100. More particularly, this timepiece 1000 is a watch.

The invention claimed is:

1. A temperature control device for a timepiece, comprising:
a first light-transmitting portion, and a second portion defining with said first portion an intermediate chamber of variable dimensions in an axial direction and/or a radial direction depending on the temperature of said first portion, wherein said first portion includes a plurality of first microlouvers according to a first spatial distribution, and said second portion includes a plurality of second microlouvers according to a second spatial distribution, said first and second portions provided with these first and second microlouvers being configured to move in relation to one another, thus varying the transmission and/or the reflection of said light on said first portion between a maximum and a minimum.

2. The temperature control device, according to claim 1, wherein the first microlouvers and the second microlouvers are arranged to superimpose partially or totally in certain relative positions of said first portion in relation to said second portion, in order to vary the transmission and/or the reflection of the incident light on said first portion between a maximum and a minimum.

3. The temperature control device according to claim 1, wherein said first portion is configured to move in an axial direction and/or a radial direction relative to said second portion depending on the temperature of said first portion.

4. The temperature control device according to claim 1, wherein said first portion has a first thermal expansion coefficient, which is different from a second thermal expansion coefficient of said second portion.

5. The temperature control device according to claim 1, wherein said first portion or said second portion is mounted on a third portion, which has a third thermal expansion coefficient that is different from a first thermal expansion coefficient of said first portion and/or from a second thermal expansion coefficient of said second portion.

6. The temperature control device according to claim 1, wherein said first spatial distribution and said second spatial distribution are homothetic or identical.

7. The temperature control device according to a claim 1, wherein said first microlouvers are located on a lower surface of said first portion, at said intermediate chamber.

8. The temperature control device according to claim 1, wherein said second microlouvers are located on an upper surface of said second portion, at said intermediate chamber.

9. The temperature control device according to claim 1, wherein said first microlouvers and/or said second microlouvers include a reflective coating.

10. The temperature control device according to claim 1, wherein said first spatial distribution and second spatial distribution, and the dimensions of said first portion and of said second portion are adjusted for a maximum reflection at higher temperatures, and for a maximum transmission at lower temperatures.

11. The temperature control device according to claim 1, wherein said first portion includes at least one first coated and/or structured reflective portion, arranged to send back oblique light rays in relation to an axial direction of said timepiece and to allow light rays to pass through in this said axial direction.

12. The temperature control device according to claim 1, wherein said first portion includes at least one first coated and/or structured reflective portion, arranged to send back oblique light rays in relation to an axial direction of said timepiece and to allow light rays to pass through in said axial direction, the at least one said first reflective portion includes prismatic structures protruding on said first portion, disposed according to said first spatial distribution, and each including a reflective coating.

13. The temperature control device according to claim 1, wherein said first portion includes at least one first coated and/or structured reflective portion, arranged to send back oblique light rays in relation to an axial direction of said timepiece and to allow light rays to pass through in said axial direction, the at least one said first reflective portion includes reflective structures embedded within said first portion for a better abrasion resistance, disposed according to said first spatial distribution, and each including a reflective coating.

14. The temperature control device according to claim 1, wherein said first portion is a protective cover and wherein said second portion is a watch crystal.

15. A timepiece comprising at least one of the temperature control device according to claim 1.

16. The timepiece according to claim 15, wherein the timepiece is a watch.

\* \* \* \* \*